United States Patent
Myers

(10) Patent No.: US 12,494,552 B2
(45) Date of Patent: Dec. 9, 2025

(54) BATTERY PACK ASSEMBLY

(71) Applicant: Dana Myers, Silver Lake, OH (US)

(72) Inventor: Dana Myers, Silver Lake, OH (US)

( * ) Notice: Subject to any disclaimer, the term of this patent is extended or adjusted under 35 U.S.C. 154(b) by 140 days.

(21) Appl. No.: 18/574,946

(22) PCT Filed: Jun. 28, 2022

(86) PCT No.: PCT/US2022/035250
§ 371 (c)(1),
(2) Date: Dec. 28, 2023

(87) PCT Pub. No.: WO2023/278397
PCT Pub. Date: Jan. 5, 2023

(65) Prior Publication Data
US 2024/0347872 A1    Oct. 17, 2024

Related U.S. Application Data

(60) Provisional application No. 63/216,144, filed on Jun. 29, 2021.

(51) Int. Cl.
*H01M 50/514*    (2021.01)
*B60K 1/04*    (2019.01)
(Continued)

(52) U.S. Cl.
CPC ............. *H01M 50/514* (2021.01); *B60K 1/04* (2013.01); *B60L 50/64* (2019.02);
(Continued)

(58) Field of Classification Search
CPC ............. H01M 50/514; H01M 50/262; H01M 50/249; H01M 50/213; H01M 50/271;
(Continued)

(56) References Cited

U.S. PATENT DOCUMENTS 6,187,470 B1 * 2/2001 Peterson ............. H01M 50/213
429/100
8,968,900 B2   3/2015 Mullet et al.
(Continued)

FOREIGN PATENT DOCUMENTS

| CN | 106921006 | 7/2017 |
| EP | 2343752 | 7/2011 |
| GB | 2545567 | 6/2017 |

OTHER PUBLICATIONS

International Search Report from International Application PCT/US2022/035250, mailing date Nov. 1, 2022.
(Continued)

*Primary Examiner* — Michael L Dignan
(74) *Attorney, Agent, or Firm* — RENNER KENNER GREIVE BOBAK TAYLOR & WEBER

(57) ABSTRACT

A battery pack assembly for an electric vehicle includes a plurality of battery modules, each of the plurality of battery modules including a plurality of tubes, each of the plurality of tubes including a plurality of individual battery cells therein, where the plurality of individual battery cells within each of the plurality of tubes are in series configuration; and a pair of end cap assemblies positioned at respective ends of the plurality of tubes, the pair of end cap assemblies securing the plurality of individual battery cells and the plurality of tubes in a tightened position by mechanical pressure; the pair of end cap assemblies including a respective electrical connector for connecting the plurality of individual battery cells to the electric vehicle when the battery pack assembly is in the tightened position.

17 Claims, 13 Drawing Sheets

(51) Int. Cl.
  *B60L 50/64* (2019.01)
  *H01M 50/213* (2021.01)
  *H01M 50/249* (2021.01)
  *H01M 50/262* (2021.01)
  *H01M 50/271* (2021.01)
  *H01M 50/291* (2021.01)
  *H01M 50/509* (2021.01)

(52) U.S. Cl.
  CPC ....... *H01M 50/213* (2021.01); *H01M 50/249* (2021.01); *H01M 50/262* (2021.01); *H01M 50/271* (2021.01); *H01M 50/291* (2021.01); *H01M 50/509* (2021.01); *H01M 2220/20* (2013.01)

(58) Field of Classification Search
  CPC ............. H01M 50/291; H01M 50/509; H01M 2220/20; H01M 50/233; H01M 50/244; H01M 50/264; H01M 50/507; H01M 50/51; H01M 50/512; H01M 50/548; B60K 1/04; B60L 50/64; Y02E 60/10
  See application file for complete search history.

(56) References Cited

U.S. PATENT DOCUMENTS

| | | | |
|---|---|---|---|
| 9,738,976 B2* | 8/2017 | Pyzza | C23C 16/50 |
| 2004/0043287 A1* | 3/2004 | Bando | H01M 50/51 |
| | | | 429/120 |
| 2004/0226765 A1* | 11/2004 | Mathews | H01M 50/213 |
| | | | 180/68.5 |
| 2005/0068767 A1 | 3/2005 | Uke et al. | |
| 2009/0155680 A1* | 6/2009 | Maguire | H01M 10/643 |
| | | | 429/158 |
| 2013/0122341 A1* | 5/2013 | De Paoli | H01M 50/503 |
| | | | 429/99 |
| 2018/0034020 A1 | 2/2018 | Neuss | |
| 2018/0261808 A1* | 9/2018 | Brace | H01M 50/244 |
| 2020/0287184 A1* | 9/2020 | Pevear | H01M 10/0525 |
| 2020/0388803 A1 | 12/2020 | Nishinuma et al. | |
| 2021/0178914 A1 | 6/2021 | French et al. | |

OTHER PUBLICATIONS

Written Opinion from International Application PCT/US2022/035250, mailing date Nov. 1, 2022.
Images obtained from the Internet, around May 2021.

* cited by examiner

BATTERY PACK ASSEMBLY

CROSS-REFERENCE TO RELATED APPLICATIONS

The present application claims the benefit of U.S. Provisional Patent Application No. 63/216,144, filed Jun. 29, 2021, which is incorporated herein by reference.

FIELD OF THE INVENTION

The present invention relates to a battery pack assembly. One or more embodiments further relate to various components of the battery pack assembly. One or more embodiments further relate to utilizing mechanical pressure applied to end cap assemblies to hold tubed battery cells together.

BACKGROUND OF THE INVENTION

Electric vehicles rely on a battery pack for operation. Certain battery packs have included the use of battery sticks with stacked cylindrical cells. However, these cells are generally known to be welded together, which causes difficulties, such as requiring the entire stick or battery pack to be replaced. This entire replacement of a welded stick or battery pack is generally required even where only one or a few of the battery cells are the culprit.

GB 2545567A discloses a battery pack assembly having two holding frames holding a plurality of cells, one cell deep, longitudinally therebetween. Two or more of the plurality of cells are connected by a conductive means and the holding frames are held together by a fastening means. The battery pack assembly is disclosed for use with an electric bicycle.

There remains a need in the art for an improved battery pack assembly for an electric vehicle, particularly for an electric car, including the improvement of reducing the number of connections that have to be made between individual battery cells.

SUMMARY OF THE INVENTION

In a first embodiment, the present invention provides a battery pack assembly for an electric vehicle, the battery pack assembly including a plurality of battery modules, each of the plurality of battery modules including a plurality of tubes, each of the plurality of tubes including a plurality of individual battery cells therein, where the plurality of individual battery cells within each of the plurality of tubes are in series configuration; and a pair of end cap assemblies positioned at respective ends of the plurality of tubes, the pair of end cap assemblies securing the plurality of individual battery cells and the plurality of tubes in a tightened position by mechanical pressure; the pair of end cap assemblies including a respective electrical connector for connecting the plurality of individual battery cells to the electric vehicle when the battery pack assembly is in the tightened position.

In another embodiment, the present invention provides a battery pack assembly for an electric vehicle, the battery pack assembly including a plurality of battery modules, each of the plurality of battery modules including a plurality of tubes, each of the plurality of tubes including a battery cell therein, wherein the battery cells are in series configuration; and a pair of end cap assemblies positioned at respective ends of the plurality of tubes, the pair of end cap assemblies securing the plurality of individual battery cells and the plurality of tubes in a tightened position by mechanical pressure; the pair of end cap assemblies including a respective electrical connector for connecting the plurality of individual battery cells to the electric vehicle when the battery pack assembly is in the tightened position.

BRIEF DESCRIPTION OF THE DRAWINGS

Advantages of the present invention will become better understood with regard to the following description, appended claims, and accompanying drawings wherein:

DETAILED DESCRIPTION OF ILLUSTRATIVE EMBODIMENTS

Figure 1:
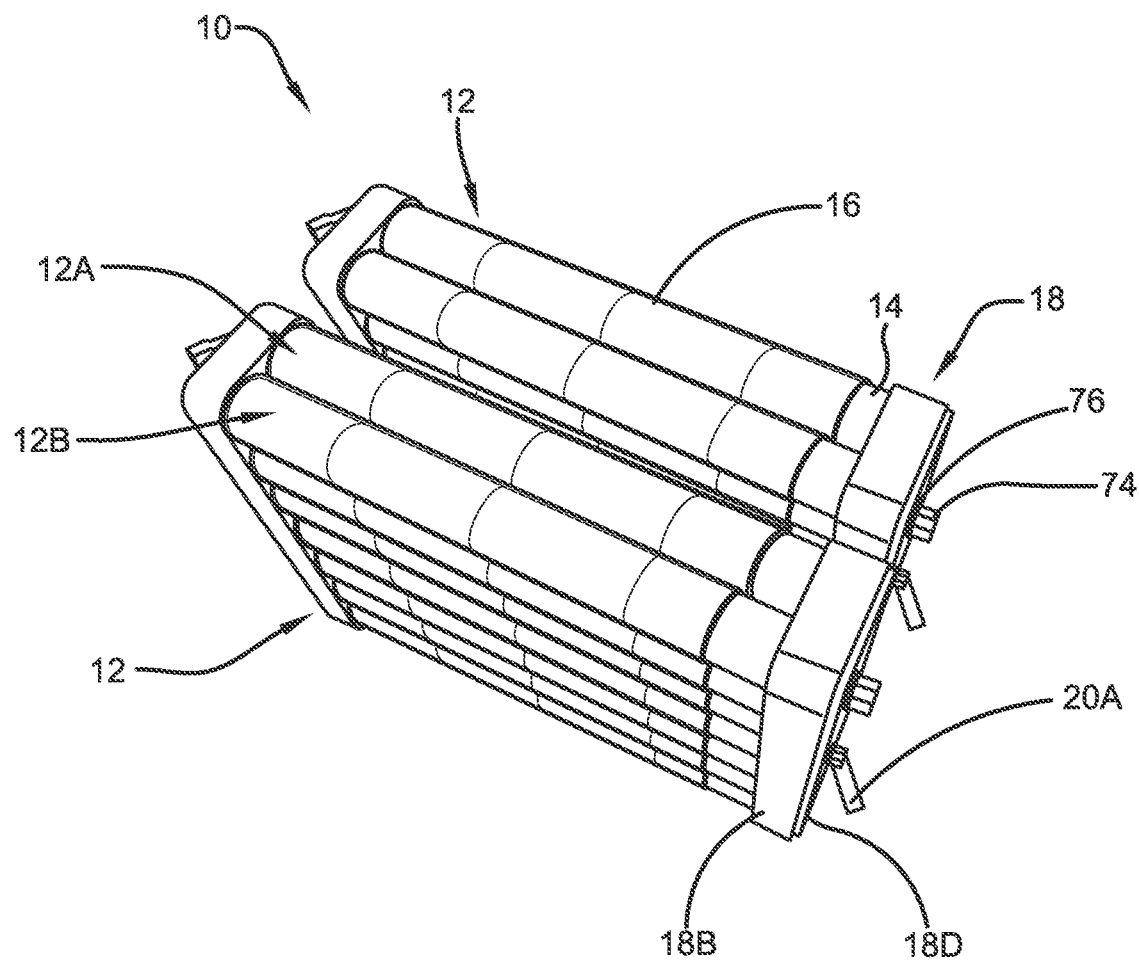
FIG. 1 is a perspective view of a battery pack assembly, shown with two battery modules connected into a battery pack assembly for use with an electric car, which modules include multiple tubes of cells that are connected by electrical contact in series, shown with battery pack modules that are made of two rows or sub-modules, where each module has two rows of seven tubes and each tube has four battery cells, according to one or more embodiments of the present invention.

One or more embodiments of the present invention provide a battery pack assembly. Embodiments of the present invention also include the various components of the battery pack assembly. The battery pack assembly includes a plurality of battery modules. A battery module includes a plurality of individual battery cells. A plurality of individual battery cells can be layered in series in the form of a battery stick. In other embodiments, a plurality of individual battery cells are in a single layer. Where battery sticks are utilized, each battery stick includes a plurality of individual battery cells. A plurality of individual battery cells can be within a battery tube, and a battery module can include a plurality of battery tubes. A battery tube generally holds a plurality of battery tubes in a secure position.

The plurality of individual battery cells, which can include tubed batteries, are held together by a pair of end cap assemblies. The end cap assemblies hold the plurality of individual battery cells together with mechanical pressure applied at one or both ends. The end cap assemblies do not utilize welding or soldering of cells in order to hold the plurality of individual battery cells together or to electrically connect the plurality of individual battery cells. In this regard, one or more embodiments of the battery pack assembly may be devoid of, or substantially devoid, of welding or soldering in order to hold the plurality of individual battery cells together or to electrically connect the plurality of individual battery cells. Though, welding or soldering of certain connection pieces may be utilized (e.g. soldering a wire with a connector piece externally of the battery module). Since the end cap assemblies hold the plurality of individual battery cells together with mechanical pressure, rather than by welding or soldering, the end cap assemblies can be easily disassembled in order to repair or replace components of the battery pack assembly (e.g. one or more bad battery cells). The battery pack assembly enables replacement of individual battery cells, sticks, and/or modules. An exemplary mechanical pressure includes utilizing one or more threaded fasteners extending the length between the pair of end cap assemblies. Other mechanical pressure techniques are discussed herein below.

Where a plurality of battery cells are utilized within a battery stick, the battery cells of an individual battery stick, which may be within a tube, are in series configuration.

In one or more embodiments, each battery stick may be series configuration with the other battery tubes to thereby form a battery module. Where the battery sticks are in series configuration, the battery modules are in parallel configuration with the other modules of the vehicle (e.g. electric car). This configuration of battery sticks connected in series, and modules connected in parallel, provides for each module having the same voltage as the whole battery pack assembly. This allows for modules to be replaced, added, or removed, from the battery pack assembly while still having the battery pack assembly operable. This further provides for the ability to increase the driving range of an electric vehicle without a need to change the voltage of the vehicle, such that the motor, controller/inverter, DC/DC converter, and charger algorithms can stay the same, even while having the ability to change the range.

In other embodiments, each battery stick may be parallel configuration with the other battery tubes to thereby form a battery module. Where the battery sticks are in parallel configuration, the battery modules are in series configuration with the other modules of the vehicle. In this configuration, the voltage of the overall battery pack assembly will change if more modules are added or removed.

As further discussion of advantages and embodiments, the present invention provides a method to use pressure to connect two or more battery cells together in series in a battery tube, or inside a structure with tubes inside it. The present invention also provides a method to use pressure to connect multiple tubes together to form a battery module. In a further embodiment, the present invention provides a method to replace individual battery cells, to easily recycle battery cells at the end of life of the battery pack, and to reduce fire hazards if a car is involved in an accident, with a design that frees battery cells from being welded or soldered, or otherwise frees battery cells from being strongly connected (e.g. within foam), to other battery cells.

With reference to the Figures, a battery pack assembly according to one or more embodiments of the present invention is generally indicated by the numeral 10. Battery pack assembly 10, which may also generally be referred to as a pack 10 or a battery pack 10, includes a plurality of battery modules 12. Each battery pack module 12, which may also generally be referred to as a module 12 or a battery pack module 12, includes a plurality of individual battery cells 14.

A plurality of the individual battery cells 14 can be within a tube 16. A battery module 12 can include a plurality of tubes 16 each having a plurality of battery cells 14. Said another way, each tube 16 can include a plurality of battery cells 14, and the module 12 can include a plurality of the tubes 16. The inner diameter of tube 16 should be sized relative to the outer diameter of battery cells 14 as to securely position the battery cells 14 relative to the other cells 14 within any given tube 16. This may be referred to as a tight or snug fit for the inner diameter of tube 16 relative to the outer diameter of battery cells 14. In one or more embodiments, the inner diameter of tube 16 is substantially similar to the outer diameter of battery cells 14 as to securely position the battery cells 14 relative to the other cells 14 within any given tube 16.

Figure 4:
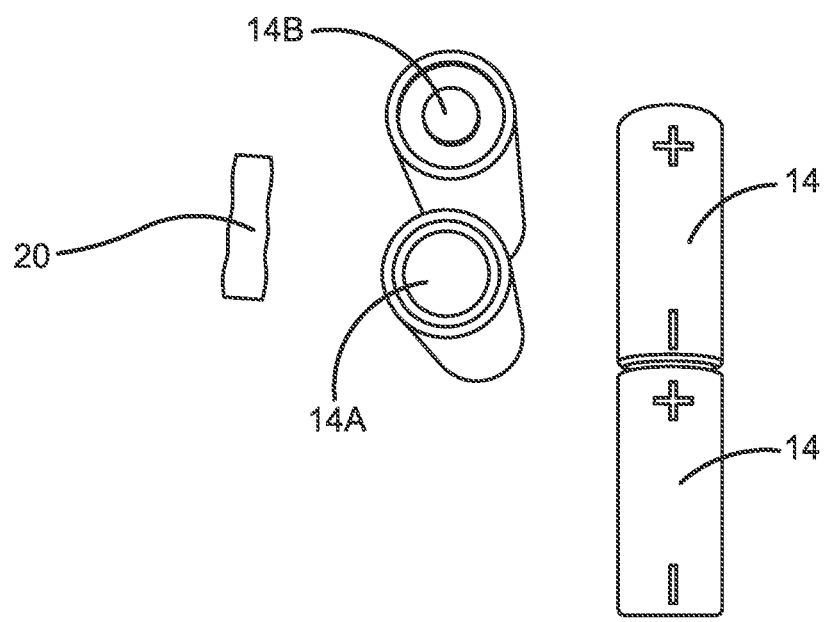
FIG. 4 is a top perspective view of battery cells and a connector, according to one or more embodiments of the present invention.

The ends of each of the plurality of the tubes 16 are held in place by a respective end cap assembly 18 at both ends, which can include the ends being positioned in or positioned below the respective end cap assembly 18, which may also generally be referred to as an end cap 18. As appropriate, an end of a first plurality of battery cells 14 is connected to a next plurality of battery cells 14 by way of a connector 20, which may be within end cap assembly 18. Exemplary suitable connectors include metal tabs (e.g. FIG. 4) and wires (e.g. FIG. 2) and combinations thereof. The connectors may be made from any suitable material, such as nickel. The connectors 20 may include an insulated female disconnect piece 20A (FIG. 1).

In one or more embodiments, the tubes 16 may extend the entire length between end cap assemblies 18. In other embodiments, the tubes 16 may extend a partial length between end cap assemblies 18, as particularly shown in FIG. 1 and FIG. 2. The partial length tubes 16 may be referred to as sleeves 16. In one or more embodiments, sleeves 16 extend from about halfway of the end cell 14 to about halfway of the other end cell 14. In one or more embodiments, the tubes 16 may be all of the same length. In one or more embodiments, the tubes 16 may be of different lengths.

The electrical configuration of the assembly 10 will now be further described. The connection of a first plurality of battery cells 14 (e.g. tube 16) with a next plurality of battery cells 14 (e.g. tube 16) may be either a series connection or a parallel connection.

Figure 3:
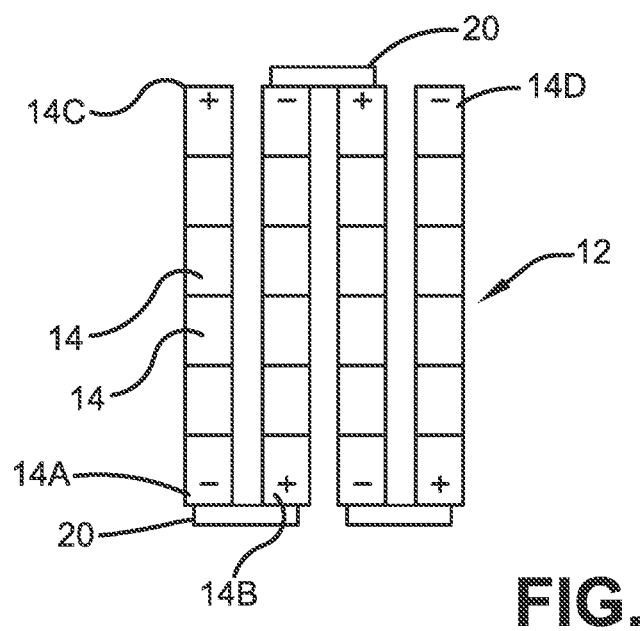
FIG. 3 is a schematic of flow of current through a battery module where battery sticks are connected in series, according to one or more embodiments of the present invention.

For a series connection of a first plurality of battery cells 14 (e.g. tube 16) with a next plurality of battery cells 14 (e.g. tube 16), as best seen in FIG. 3, a negative end 14A of a first plurality of battery cells 14 is connected with a positive end 14B of a second plurality of battery cells 14 by way of connector 20. And a negative end 14A of the second plurality of battery cells 14 is connected with a positive end 14B of a third plurality of battery cells 14 by way of connector 20. Said another way, the positive or negative terminal of the first plurality of battery cells 14 is connected with the opposing charged terminal of the second plurality of battery cells 14 by way of connector 20. This series configuration continues for any remaining pluralities of battery cells 14 that are within battery tubes 16. As such, the pluralities of battery cells 14 of a tube 16 are within series configuration.

Figure 16:
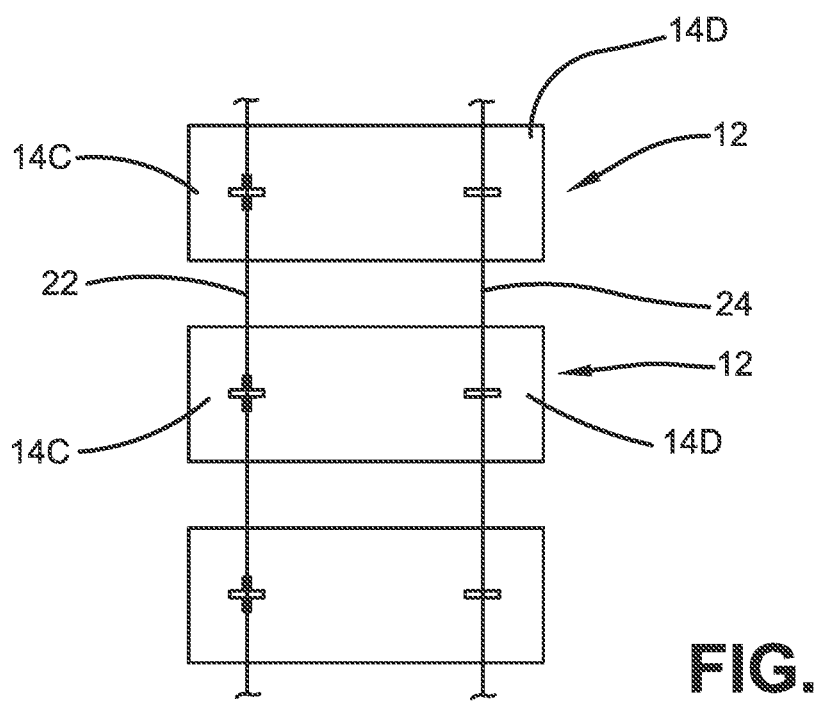
FIG. 16 is a schematic of flow of current through a plurality of the battery cell modules of FIG. 3, where each of the battery modules are connected in parallel, according to one or more embodiments of the present invention.

For a series connection of a first plurality of battery cells 14 with a next plurality of battery cells 14 (e.g. of tubes 16), the modules 12 should be in parallel connection, as best shown in FIG. 3 and FIG. 16. As shown in FIG. 16, an overall negative end 14D of first module 12 is coupled with the overall negative end of 14D of a second module 12 by a connector 20, which can be a first negative wire 24. An overall positive end 14C of first module 12 is coupled with the overall positive end 14C of second module 12 by a connector 20, which can be a first positive wire 22. This parallel configuration also continues for any remaining modules 12.

Figure 6:
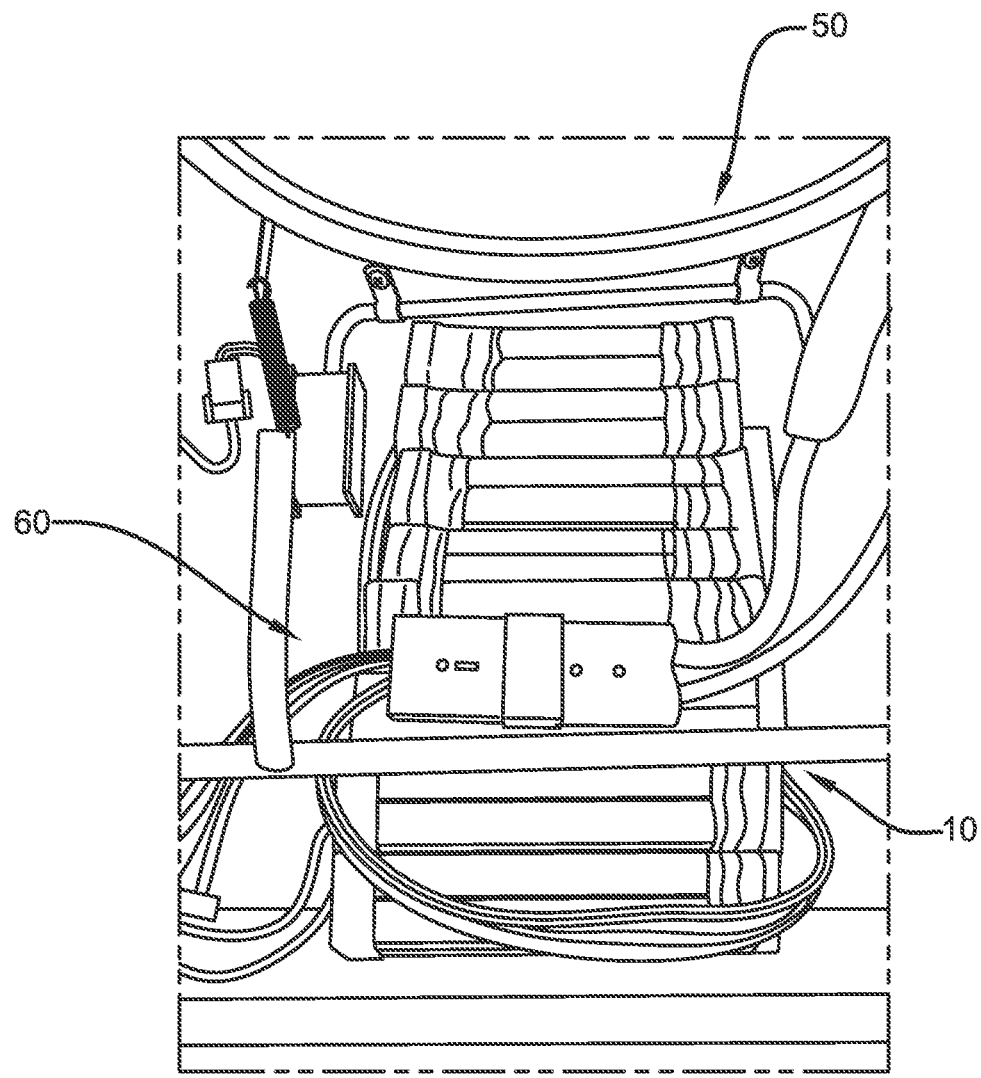
FIG. 6 is a top perspective view of a battery pack assembly, shown with multiple battery modules connected into a battery pack assembly in an electric car, according to one or more embodiments of the present invention.
Figure 7:
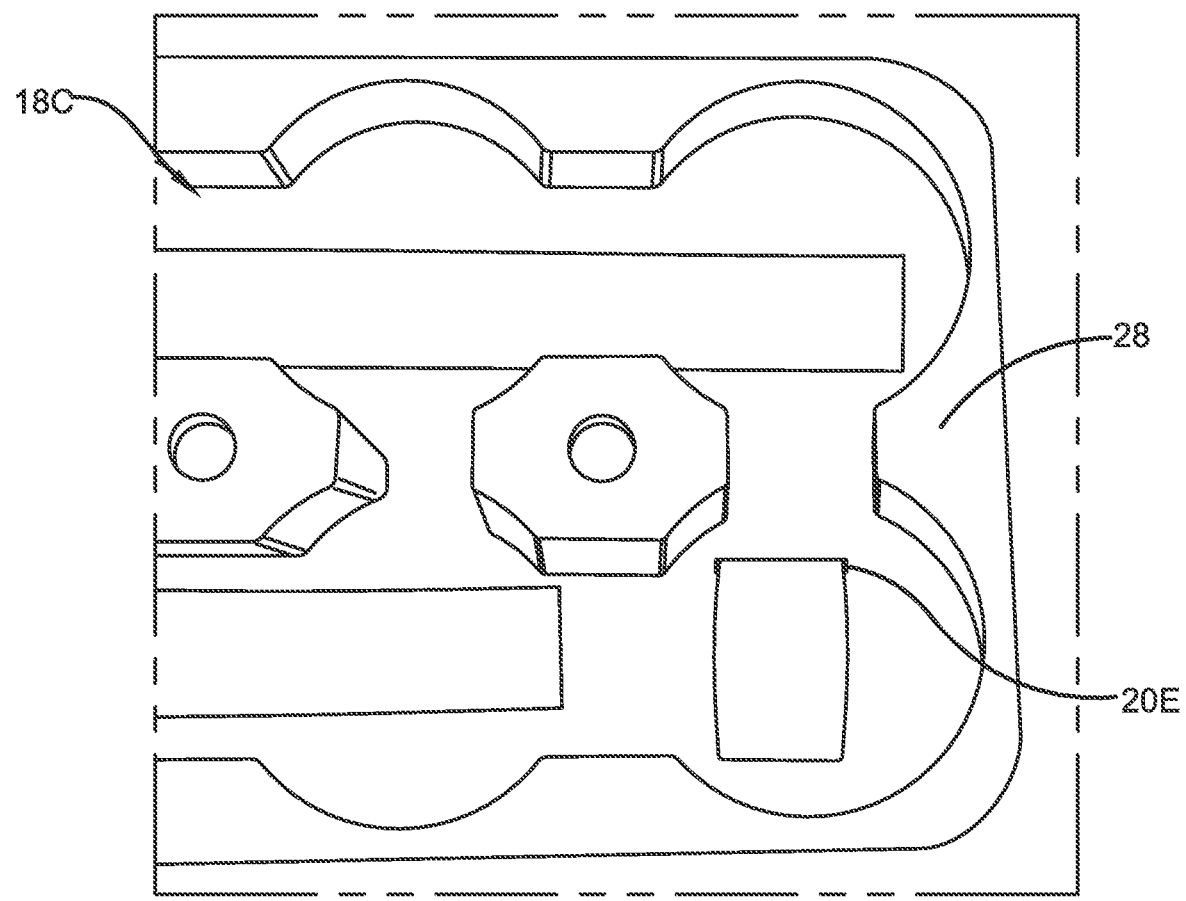
FIG. 7 is a partial internal view of an alternative endcap assembly, according to one or more embodiments of the present invention.

In embodiments where battery pack assembly 10 first provides a series configuration for each plurality of battery cells 14 (e.g. tube 16) and modules 12 are then connected in parallel, some specific advantages may arise. For one, each module 12 automatically balances with every other module 12. That is, each module 12 is automatically the same voltage as every other module 12. This automatic balancing of battery pack assembly 10 further serves to reduce the complexity of a corresponding battery management system (BMS) (not shown). Moreover, the voltage of the battery pack assembly 10 stays the same no matter how many more battery modules 12 are utilized with (i.e. plugged in to) the electric vehicle 50 (FIG. 6; e.g. electric car 50). This means the electric vehicle 50 can be provided with a multitude of variable ranges, which would all be based on how many modules 12 are put in the vehicle 50. This multitude of variable ranges further serves to provide the ability to add or reduce range without having to modify or change other aspects, such as a controller, a charger, or DC/DC settings.

As other advantages, the number of battery connection points may be minimized. The amount of copper needed may also be reduced. And the whole wiring may become simpler, lighter, and less expensive. Still further, the BMS costs may be reduced and provide for quick location of bad cells 14.

As a further advantage, when charging battery pack assembly 10, the current gets divided up among all the modules 12. For example, if there are 40 modules per vehicle, and if 40 amps are provided, each module 12 is only getting 1 amp, or about 0.3 C. This can be better for the individual cells 14. The operation of battery pack assembly 10 is very battery friendly when utilized with an electric vehicle 50. The quicker charging with lower amps also means less need for accounting for corresponding cooldown from the heat of charging.

Figure 17:
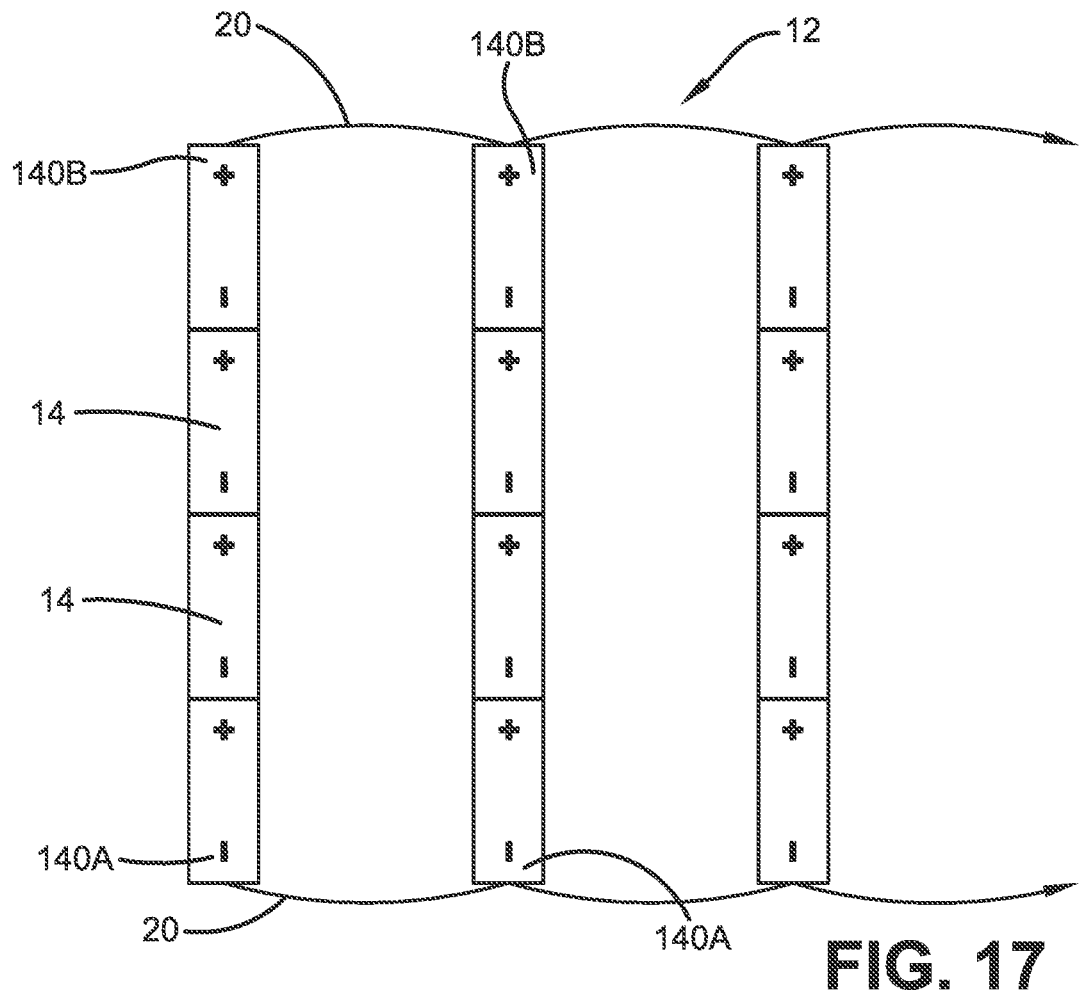
FIG. 17 is a schematic of flow of current through a battery cell module wherein battery sticks are connected in parallel, according to one or more embodiments of the present invention.

In other embodiments, the connection of a first plurality of battery cells 14 with a next plurality of battery cells 14 may be a parallel connection. For a parallel connection of a first plurality of battery cells 14 (e.g. tube 16) with a next plurality of battery cells 14 (e.g. tube 16), as best seen in FIG. 17, a negative end 140A of a first plurality of battery cells 14 is connected with a negative end 140A of a second plurality of battery cells 14 by way of connector 20. And a positive end 140B of a first plurality of battery cells 14 is connected with a positive end 140B of a second plurality of battery cells 14 by way of connector 20. Said another way, the positive or negative terminal of the first plurality of battery cells 14 is connected with the similar charged terminal of the second plurality of battery cells 14 by way of connector 20. This parallel configuration continues for any remaining pluralities of battery cells 14 that are within battery tubes 16. As such, the pluralities of battery cells 14 of a tube 16 are within series configuration.

Figure 18:
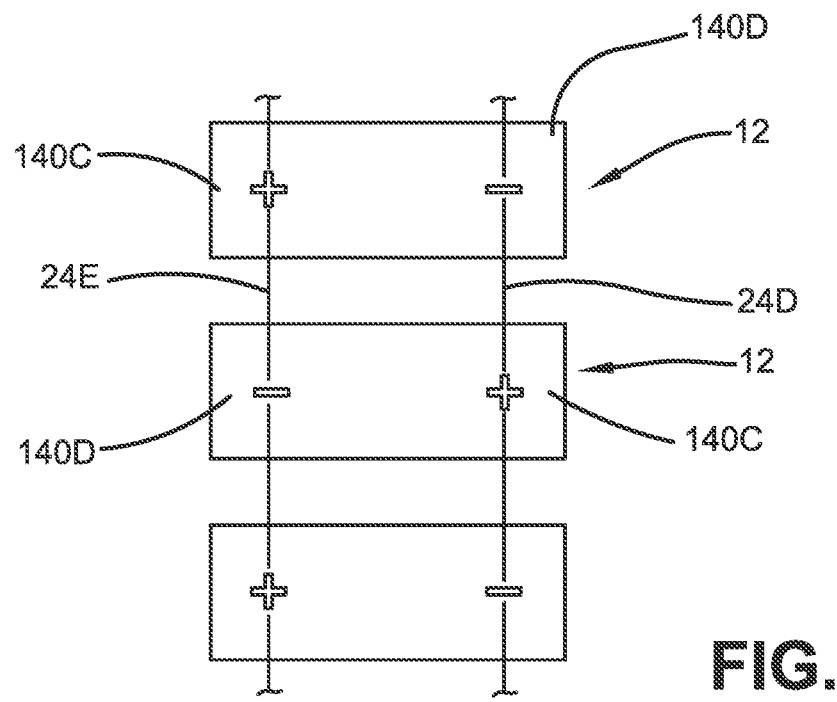
FIG. 18 is a schematic of flow of current through a plurality of the battery cell modules of FIG. 17, where each of the battery modules are connected in series, according to one or more embodiments of the present invention.

For a parallel connection of a first plurality of battery cells 14 (e.g. tube 16) with a next plurality of battery cells 14 (e.g. tube 16), the modules 12 should be in series connection, as best shown in FIG. 18. As shown in FIG. 18, an overall negative end 140D of first module 12 is coupled with the overall positive end 140C of a second module 12 by a connector 20, which can be a wire 24D. An overall positive end 140C of first module 12 is coupled with the overall negative end 140D of second module 12 by a connector 20, which can be a wire 24E. This series configuration also continues for any remaining modules 12.

Figure 2:
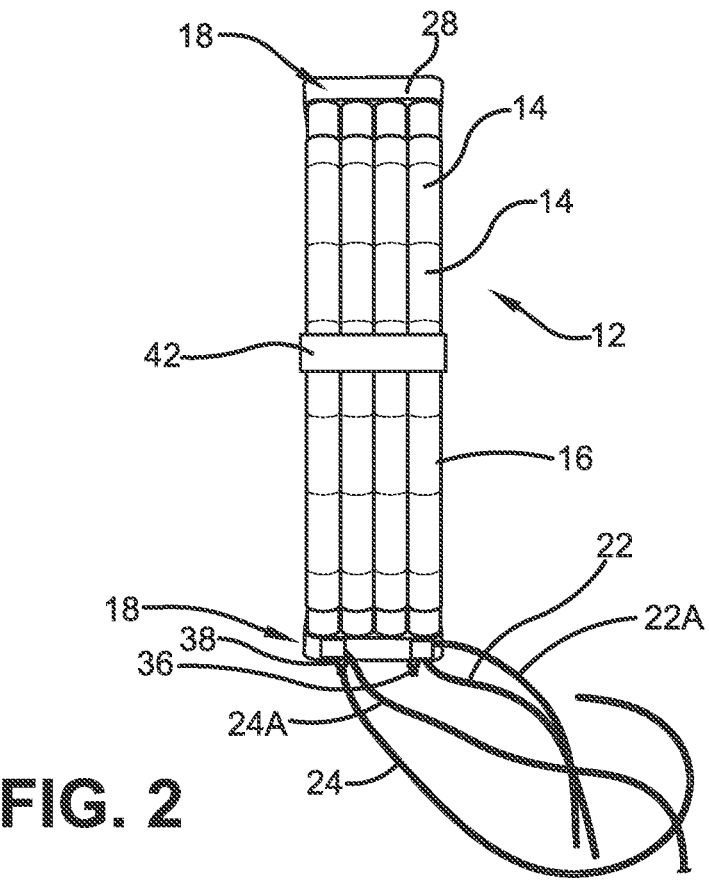
FIG. 2 is a top perspective view of a battery pack module, according to one or more embodiments of the present invention.

With reference to FIG. 2, a module 12 can include a variety of rows 12A, 12B of battery sticks, which may include tubes 16. Module 12 can include any suitable number of rows, such as one row, two rows, three rows, and four rows. FIG. 2 shows module 12 with two rows 12A, 12B, which may also be referred to as a first sub-module 12A and a second sub-module 12B. Where present, second sub-module 12B, and any other sub-modules (not shown), will be of a similar parallel or series connection as that of the first sub-module 12A.

Figure 5:
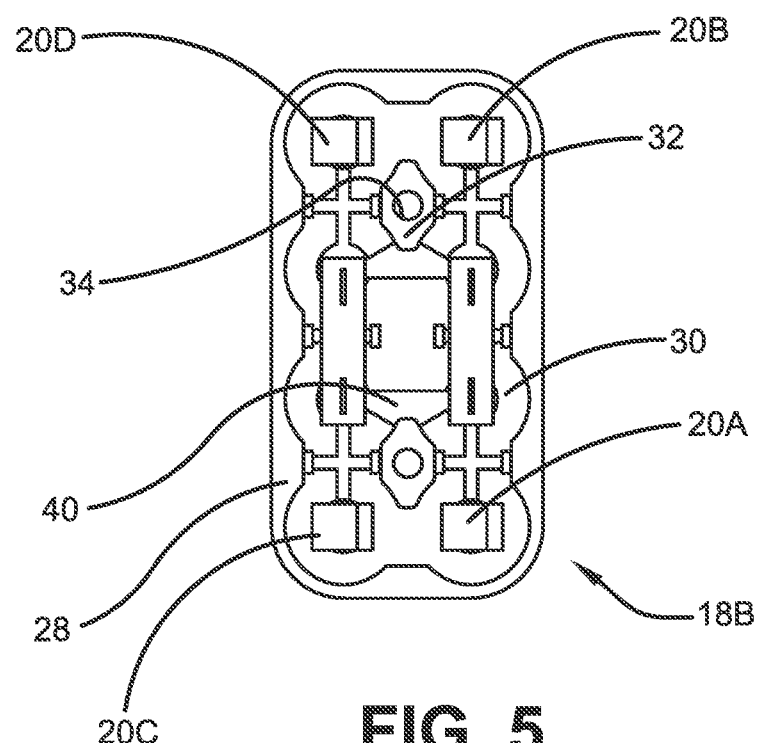
FIG. 5 is an internal bottom view of an endcap assembly, according to one or more embodiments of the present invention.

FIG. 5 shows an end cap assembly 18B for suitable use with a first sub-module 12A and a second sub-module 12B. In the configuration shown in FIG. 5, first sub-module 12A is in parallel connection with second sub-module 12B. Where any sub-modules (e.g. 12A, 12B) are present, the sub-modules relative to each other should match the overall similar parallel or series connections as all modules 12.

With reference to FIG. 1, FIG. 2, and FIG. 5, an overall positive end 14C of first sub-module 12A is coupled with the overall positive end 14C of second sub-module 12B by an internal connector tab 20 or by a first positive wire 22, by way of an intermediate connector tab 20A (FIG. 5). An overall negative end 14D of first sub-module 12A is coupled with the overall negative end 14C of the second sub-module 12B by an internal connector tab 20 or with a first negative wire 24, by way of an intermediate terminal tab 20B. Similarly, an overall positive end 14C of second sub-module 12B is coupled with a second positive wire 22A, by way of an intermediate terminal tab 20C, and an overall negative end 14D of second sub-module 12B is coupled with a second negative wire 24A, by way of an intermediate terminal tab 20D. The various wires (e.g. 22, 22A, 24, 24A) of the sub-modules 12A, 12B are then configured in a parallel configuration relative to the overall battery pack assembly 10 configuration.

Though not specifically shown, it is also possible for a first sub-module 12A and a second sub-module 12B to be configured in series with each other (e.g. as in FIG. 18).

As discussed above, in one or more embodiments, two end cap assemblies (e.g. assembly 18, 18B) are utilized per complete module 12. As discussed herein, the end cap assemblies can have a variety of specific structural configurations. To the extent applicable, the corresponding general description for the various end cap assemblies is incorporated relative to each of the various end cap assemblies.

As shown in FIG. 5, end cap assembly 18B can include a housing 28 having a plurality of openings 30, which may also be referred to as depressions 30, where the ends of cells 14 or tubes 16 are received. The shape of depressions 30 generally corresponds to the outer diameter of the cells 14 or tubes 16. The number of depressions 30 generally corresponds to the number of tubes 16.

Between depressions 30 can be securement protrusions 32 that fit between certain of the cells 14 or tubes 16. Securement protrusions 32 include a hole 34 through the middle for receiving a respective fastener 36 (e.g. threaded rod 36 or screw 36). When the tubes 16 are aligned with depressions 30, and fasteners 36 are in place, fasteners 36 are appropriately tightened. This may include utilizing a respective nut 38 to tighten each fastener 36, or protrusions 32 may include corresponding threading therein. Even further mechanical tightening means might be utilized. Once fasteners 36 are appropriately tightened, the cells 14 may be considered suitably connected via the pressure placed on them by tightening the end cap assemblies 18B.

Since the cells 14 might not all be exactly the same height, end cap assembly 18B may include a compressible material 40 within housing 28. Compressible material 40 may be provided in only one or in both end cap assemblies 18. Compressible material 40 may be positioned in between housing 28 and connectors 20/terminals tabs 20A, 20B. If there is a difference in height of the respective pluralities of cells 14, the compressible material 40 would serve to generally account for the difference in heights by compressing further for the longer plurality of cells 14. The compression of compressible material 40 causes the tightened pluralities of cells 14 to have a more similar overall height. Compressible material 40 can be any suitable compressible material and an exemplary material is neoprene.

Figure 8:
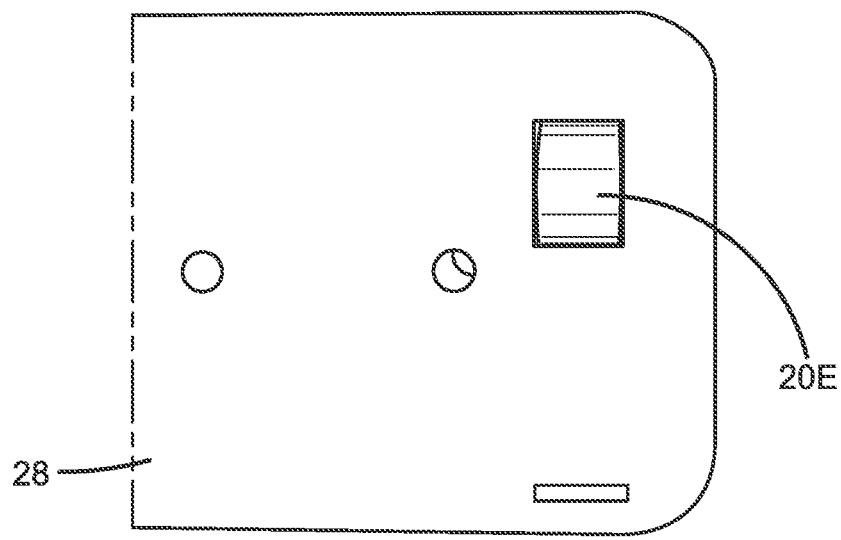
FIG. 8 is a partial exterior view of the alternative endcap assembly of FIG. 7.
Figure 9:
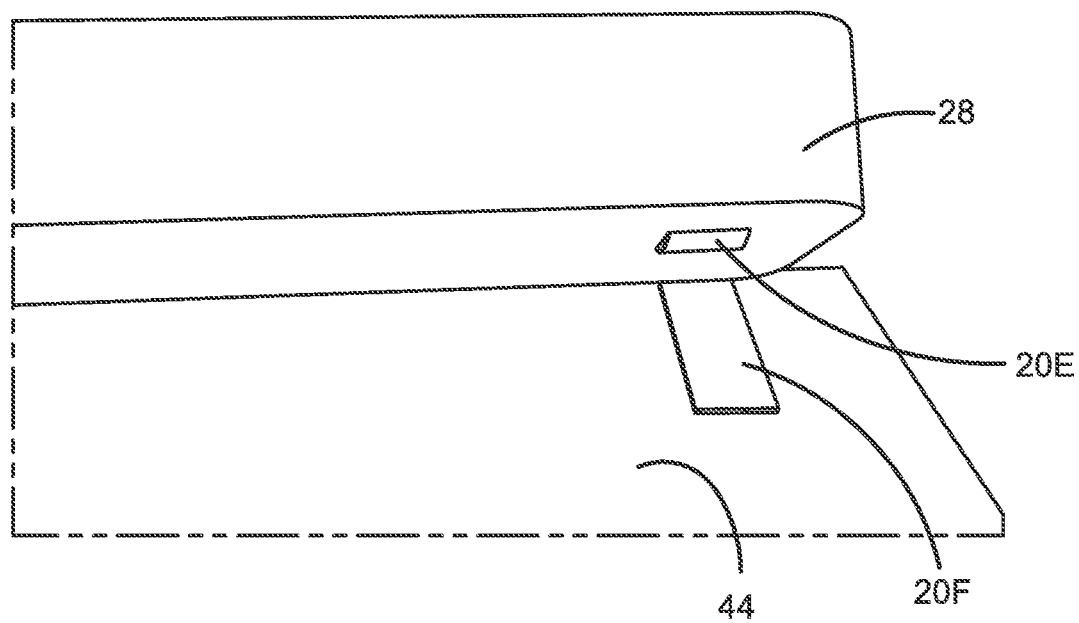
FIG. 9 is a partial perspective view of the alternative endcap assembly of FIG. 7, shown with alignment of a connector of the alternative endcap assembly with a connector on an end board.
Figure 10:
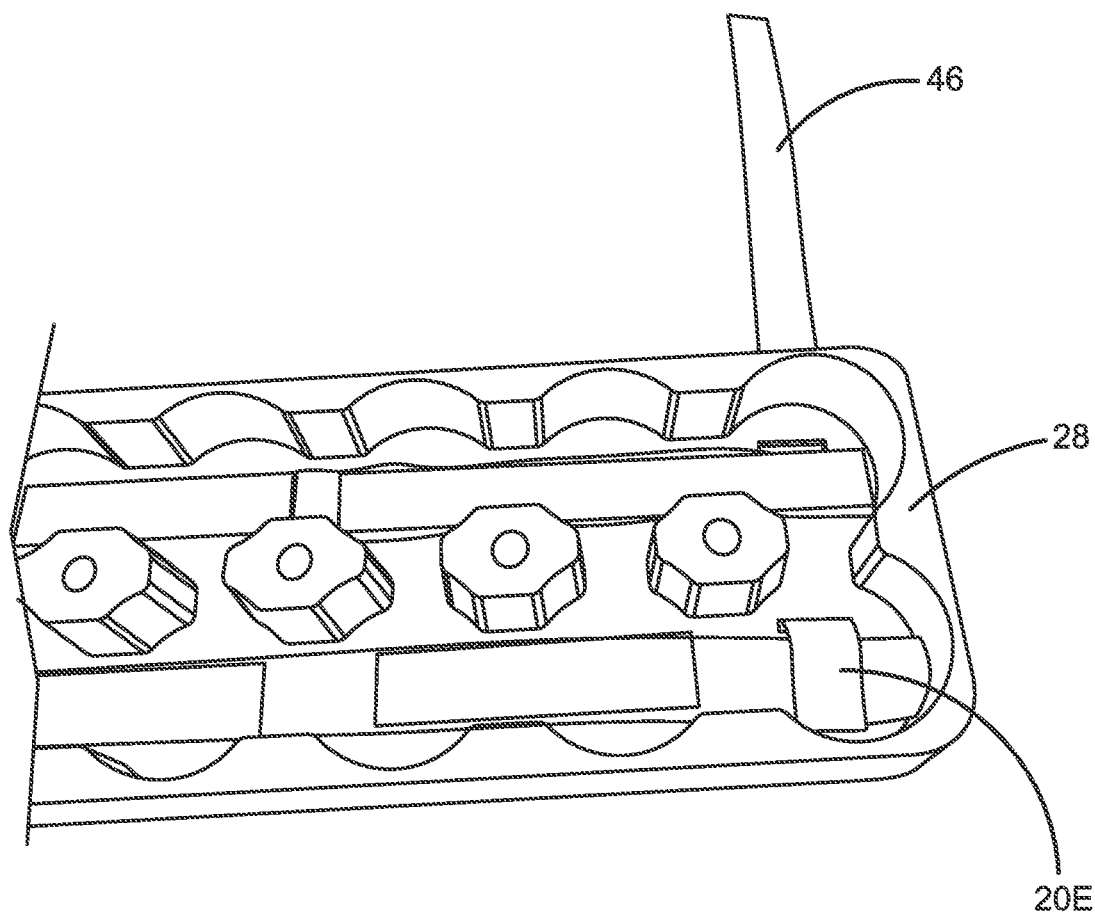
FIG. 10 is a partial perspective view of the alternative endcap assembly of FIG. 7, shown with the connector of the alternative endcap assembly in contact with the connector on the end board.

As shown in FIGS. 7-10, in an alternative configuration of end cap assembly 18C, wires (e.g. wire 22) may not be utilized, but rather connector 20E of end cap assembly 18C will be connected with a connector 20F of a separate electrical board 44. As shown in FIGS. 8 and 9, connector 20E goes to the outside of a housing 28 of end cap assembly 18C. Connector 20E is then aligned with connector 20F on electrical board 44, which may be referred to as an end board 44. When placed together, the module connector 20E touches the end board connector 20F. Then a wire or busbar 46 may be connected to the connector 20F on the end board 44 in a suitable configuration for operation of battery pack assembly 10. As will be appreciated by the skilled person, one connector 20E and the corresponding components may be utilized for the overall positive of module 12, and one connector 20E and the corresponding components may be utilized for the overall negative of module 12.

Figure 12:
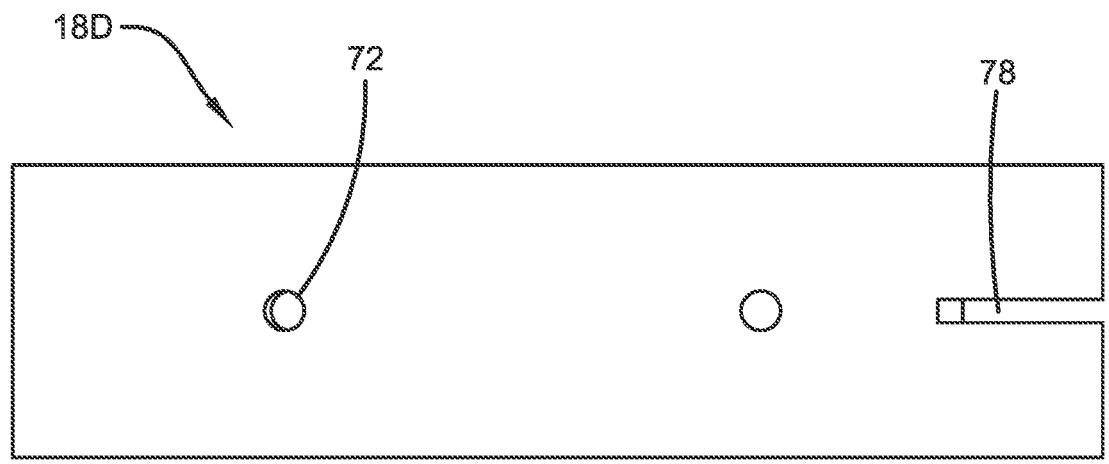
FIG. 12 is a top perspective view of an alternative flat endcap, according to one or more embodiments of the present invention.

As shown in FIG. 12, in an alternative configuration of the end cap assembly 18, a flat end cap 18D may be utilized. Flat end cap 18D is a flat end piece without any openings (i.e. openings 30) formed therein that would otherwise receive the tubes 16 and batter cells 14. Instead, the tubes 16 and batter cells 14 can be held in place with one or more separate spacers 70. Exemplary materials for flat end cap 18D are plastic or fiberglass. The corners of flat end cap 18D can be sharp or rounded.

Figure 13:
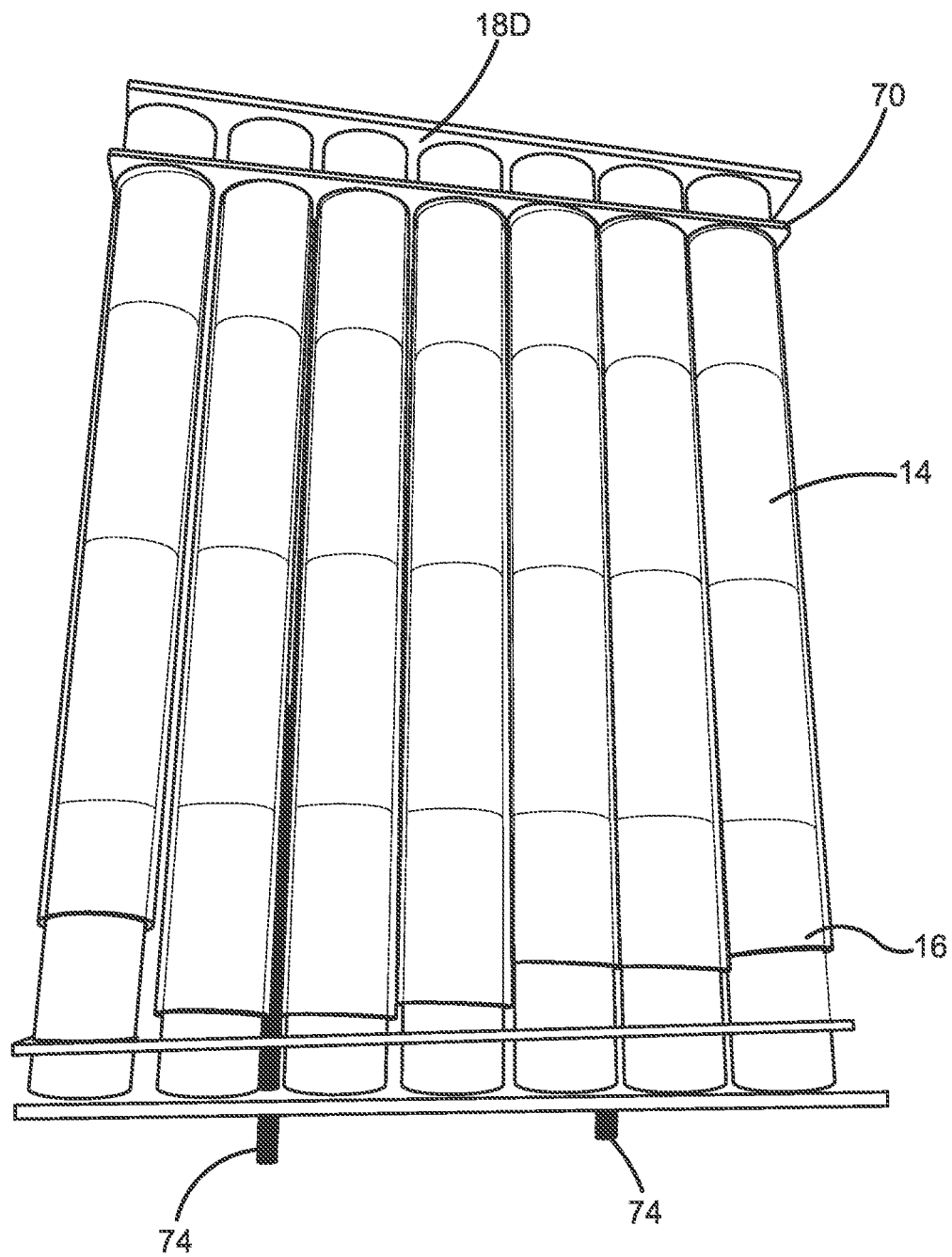
FIG. 13 is a from perspective view of a battery module having the battery spacer of FIG. 11 and the flat endcap of FIG. 12, according to one or more embodiments of the present invention.

Flat end cap 18D can include one or more holes 72 for receiving an end of a threaded rod 74. As best shown in FIG. 13, one or more threaded rods 74 can extend between the end cap assemblies 18 (e.g. end cap 18D). A corresponding nut 76 (FIG. 1), which can include a washer, can be used with the threaded rod 74 to secure the end cap assemblies 18 with the mechanical pressure. Flat end cap 18D can include one or more slots 78 for allowing an electrical connection 20 to extend externally of flat end cap 18D.

As shown in FIG. 1, in one or more embodiments, flat end cap 18D could be used externally of a tube-receiving end cap (e.g. 18B).

Figure 14:
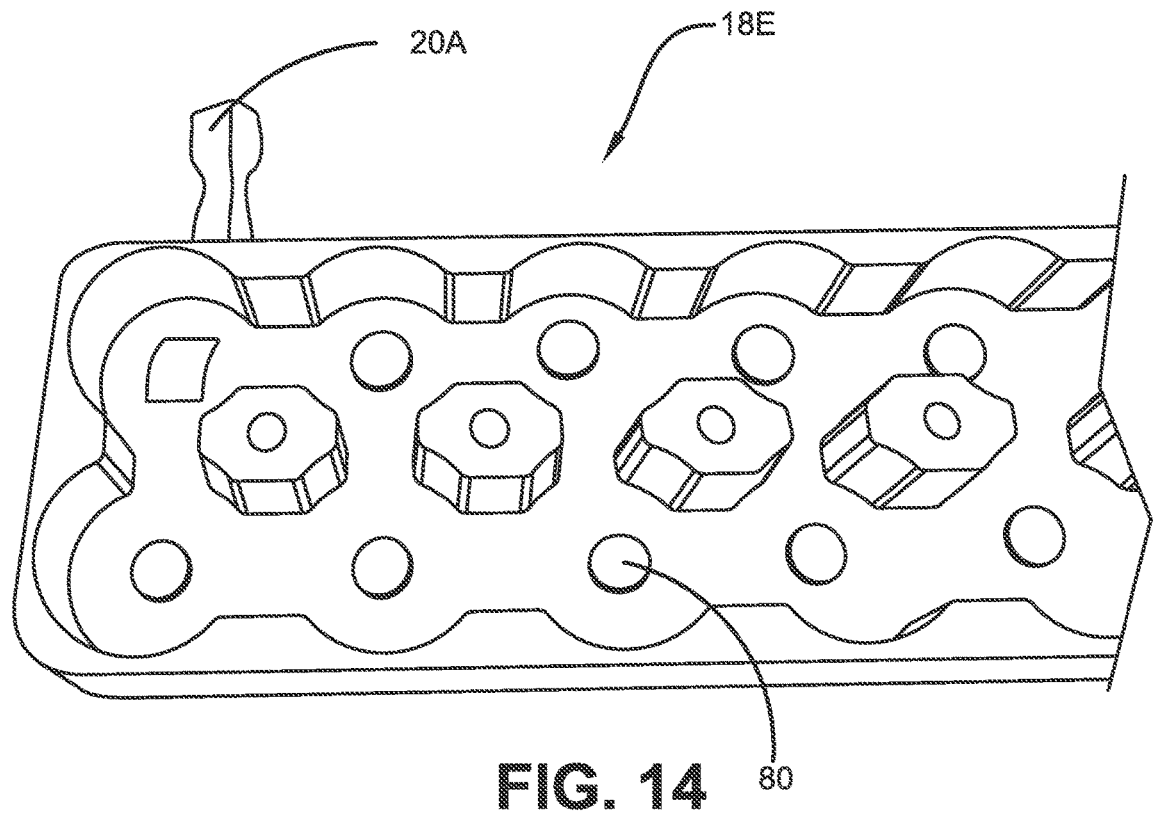
FIG. 14 is a partial internal view of an alternative endcap assembly, according to one or more embodiments of the present invention.

As shown in FIG. 14, in an alternative configuration of end cap assembly 18E, compressible material 40 of end cap assembly 18B can be replaced with a unitarily constructed housing. End cap assembly 18E can include raised circles 80, which may be referred to as raised buttons 80, in order to better secure the electrical connections of cells 14.

Figure 15:
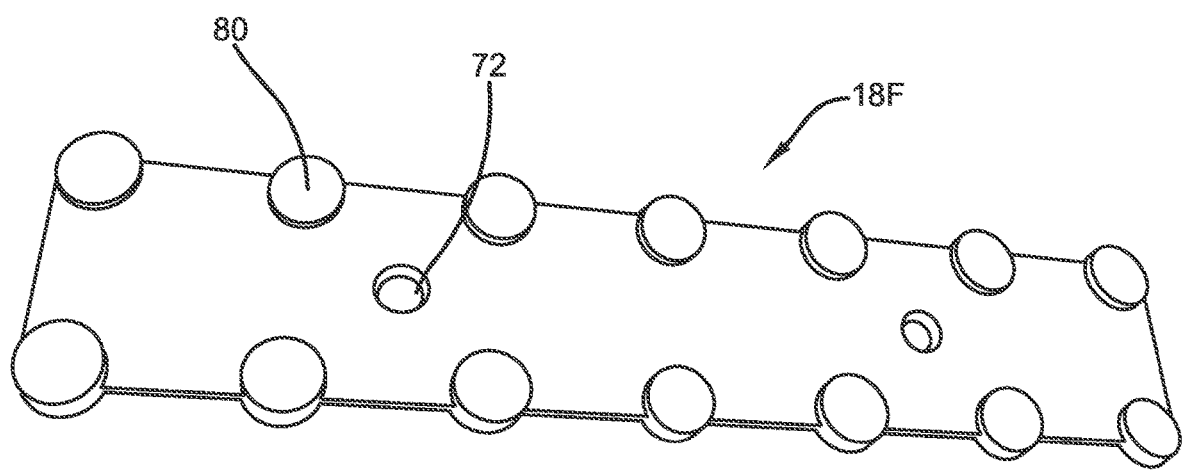
FIG. 15 is a top perspective view of an alternative endcap, according to one or more embodiments of the present invention.

As shown in FIG. 15, in an alternative configuration of end cap assembly 18F, the raised buttons 80 could be placed on a flat end cap. The raised buttons 80 can be unitary with the flat end cap, or in other embodiments, can be separate pieces that are later attached, such as with an adhesive.

In one or more embodiments, raised buttons 80 do not include elastomer. This may be referred to as these embodiments having raised buttons 80 being devoid of or substantially devoid of elastomer.

Figure 11:
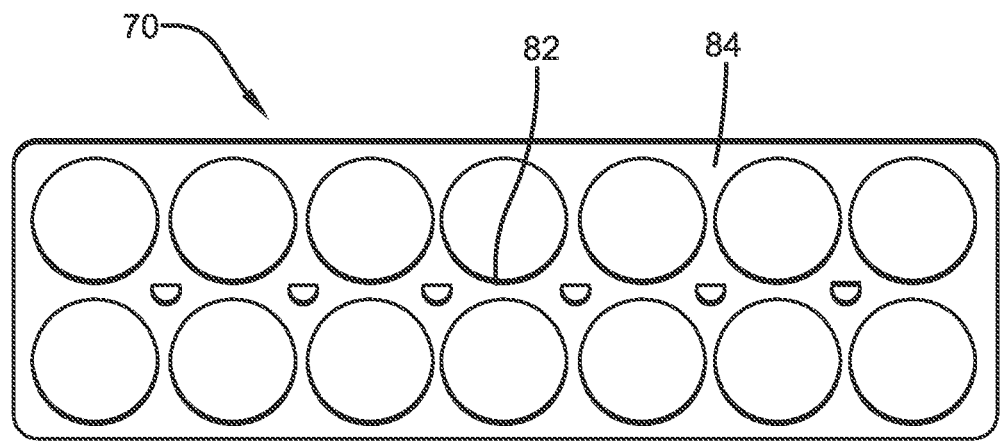
FIG. 11 is a top perspective view of a battery spacer, according to one or more embodiments of the present invention.

As suggested above, and as best shown in FIG. 11, one or more spacers 70 can be utilized to provide stability to the cells 14. Spacer 70 includes a plurality of holes 82 generally corresponding with the external size of cells 14. The number of holes 82 should correspond to the number of cells 14 within a module 12. Support material 84 surrounds the holes 82 and extends to an overall perimeter. The overall perimeter can generally correspond to the size of the end cap assemblies 18. As shown in FIG. 13, spacer 70 holds the cells 14 in the appropriate position for end cap assemblies 18 to be mechanically secured in place. As shown in FIG. 13, spacer 70 can be utilized near each end and can be beyond the position of sleeves 16.

Figure 19:
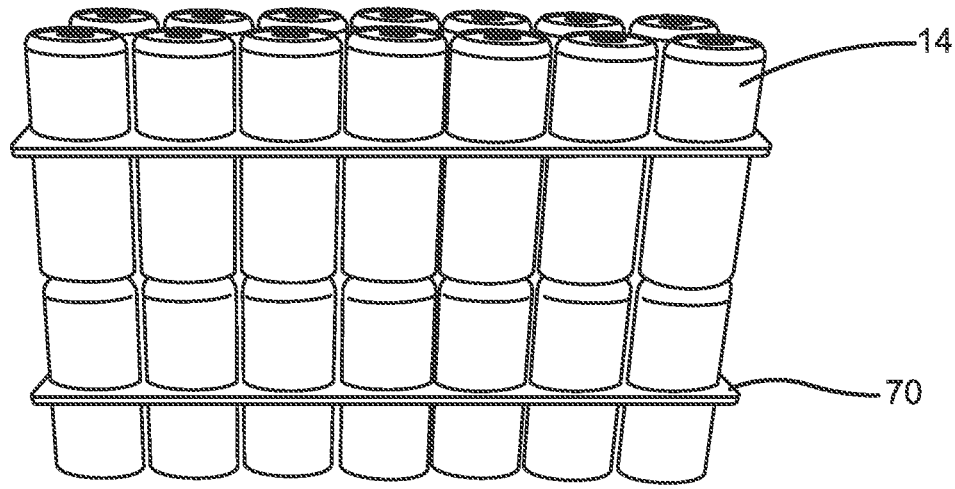
FIG. 19 is a front perspective view of a plurality of stacked battery cells, shown with each respective layer of battery cells including a battery spacer, and shown without a tube, according to one or more embodiments of the present invention.

As shown in FIG. 19, spacer 70 may be utilized near the middle of cells 14. In one or more embodiments, spacer 70 may be utilized in place of tubes 16.

Figure 20:
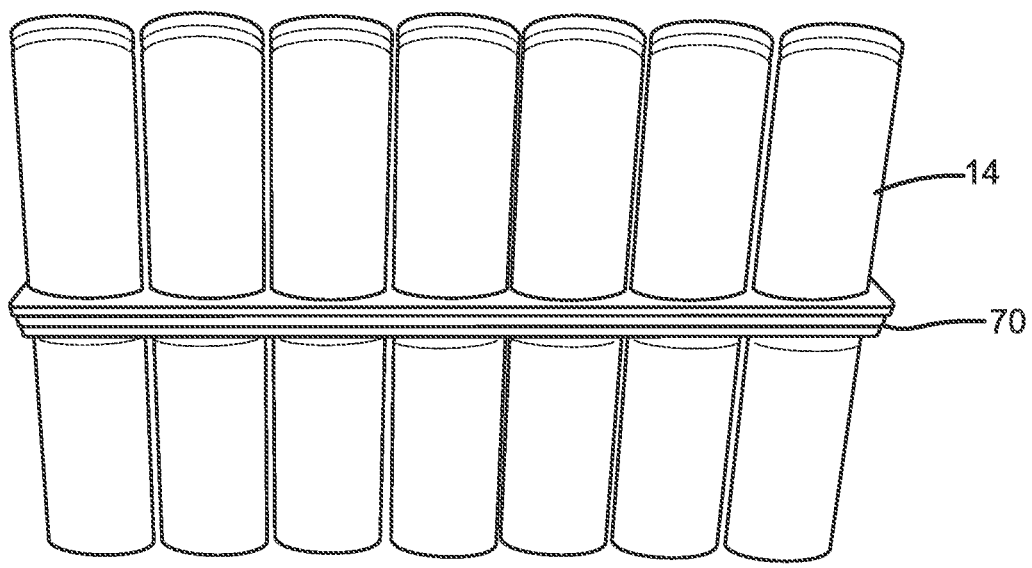
FIG. 20 is a front perspective view of a plurality of stacked battery cells, shown with a battery spacer between each respective layer of battery cells, and shown without a tube, according to one or more embodiments of the present invention.

As shown in FIG. 20, spacer 70 may be utilized generally between cells 14. In these embodiments, spacer 70 may need to be relatively thicker in order to secure cells 14 in place.

As further discussion of the mechanical pressure techniques, in addition to the threaded rod 74 and nut 76 combination discussed above, other mechanical pressure techniques include air pressure, hydraulic pressure, latches, and clamps. The desired mechanical pressure technique can generally include no gluing of battery cells 14 or soldering electrical connections to battery cells 14. When secured by the mechanical pressure technique, the end cap assemblies 18 may be said to be in a tightened position.

As discussion of providing support for a lengthy tube 16, module 12 may further include a support material 42 positioned near or at the center of module 12. This may include or more of a wrapped material, such as electrical tape, and a plastic support portion that the wrapped material is securing in place. The support material 42 may generally serve to provide further support to tubes 16 in addition to the securement by end cap assemblies 18.

Battery pack assembly 10 can be utilized within any suitable electric vehicle. As shown in FIG. 6, in one or more embodiments, battery pack assembly 10 can be utilized within an electric vehicle 50. Electric vehicle 50 can be any suitable vehicle, such as cars, trucks, SUV's, 3-wheel vehicles, and motorcycles. In one or more embodiments, battery pack assembly 10 can be utilized within a 3-wheel vehicle. In one or more embodiments, battery pack assembly 10 can be utilized within a 4-wheel vehicle.

As shown in FIG. 6, battery pack assembly 10 can be paired with a support frame 60 that is adapted to secure battery pack assembly 10 within electric car 50. Support frame 60 can include a suitable design as fit battery pack assembly 10 within a front compartment of electric car 50.

Though not shown in the Figures, in one or more embodiments, battery pack assembly 10 in vehicle 50 can further include a top sandwich panel above cells 14 (and/or a bottom sandwich panel below the cells 14), which may be particularly useful where assembly 10 includes only one cell 14 or two cells 14 as the height of cells 14. In this way, these embodiments would provide the battery pack assembly 10 as a core-type component of the overall system, which may provide additional stability for the overall system for use with vehicle 50.

Though not shown in the Figures, in one or more embodiments, a floor of a vehicle 50 can include the floor having holes for cells 14. Said another way, the cells 14 could be placed into a floor that is a thicker version of spacer 70. Then a top sandwich panel or cover (with the corresponding electrical connections) and a bottom cover sandwich panel or cover (with the corresponding electrical connections) could be placed on top and underneath this floor structure. To remove a single cell 14, the top cover could be removed and then physically pull out the cell 14, such as with a magnet or other suitable technique. For this configuration and other configurations disclosed herein, this could include replacing a single cell 14, or in other embodiments, a few cells 14, or in other embodiments, about 20% of cells 14, or in other embodiments, about 30% of cells 14.

When battery pack assembly 10 is in vehicle 50, and turning back to FIG. 9, the vehicle 50 could include the connector 20F of the separate electrical board 44. In this way, the assembly 10 as a whole might be replaceable without the need for establishing new electrical connections (such as reattaching wires). The connectors 20E of the assembly 10 could simply align with the connectors 20F of the vehicle 50.

Turning to specific details of an exemplary voltage scenario, where one cell 14 is a nominal 3.2 volts, a tube of seven cells connected in series would be a nominal 22.4 volts. Then, four tubes 16 connected in series would be a nominal 89.6 volts to form a module 12 or sub-module 12B. In this scenarios, all modules 12 (and sub-modules 12B if present) would be connected in parallel, so that the total nominal voltage of the battery pack assembly 10 would be 89.6 volts.

In another scenario, where the tubes 16 are connected in parallel inside a module 12, an exemplary 22.4 volts per tube 16 would translate into 22.4 volts for the whole module 12. Then in this scenario, if ten modules 12 are connected in series to form the battery pack assembly 10, the voltage of the battery pack assembly 10 would be a nominal 224 volts.

Further details relative to various components of battery pack assembly 10 will now be described.

Battery cells 14 can be any suitable shape and any suitable rechargeable battery chemistry. An exemplary shape for cells 14 is cylindrical. Exemplary rechargeable battery chemistry includes lithium-ion and nickel-cadmium cells. Battery cells 14 should be made consistently as to provide consistent operation of battery pack assembly 10. If cells 14 need to be 'rebalanced,' the cells 14 can be pulled out, and then paralleled, and re-installed. In the event of an accident of vehicle 50, the battery cells 14 will generally be able to break free individually, which can have advantages such as preventing widespread fire.

Any suitable number and size for battery cells 14 can be utilized. Exemplary sizes include 4680, 18650, 26650, and 32700.

Where connector 20 is a conductive tab, the tab can be made of any suitable thickness and electrically conductive material. An exemplary material is nickel.

As shown in the Figures, in one or more embodiments, tubes 16 can be individual, separate components. That is, tubes 16 may be independent or distinct from one another. An exemplary material for independent tubes 16 is plastic, which may be clear or transparent plastic. Adding cells 14 to tubes 16 may include the use of a suitable jig.

Though not shown in the Figures, in other embodiments, tubes 16 might be congruent with each other such as being formed as bores out of a solid mass. These embodiments may provide more structure for the outer boundaries of tubes 16.

As shown in the Figures, in other embodiments, tubes 16 can be directly horizontal and vertical with all other tubes 16. This may be described as a grid-type configuration or a rectangular arrangement. The grid-type arrangement may also be referred to as respective tubes 16 in rows being directly aligned with the tubes 16 of the next rows. These alternative arrangements apply to the tubes 16 as individual components and to the tubes 16 formed out of a solid mass.

Though not shown in the Figures, in other embodiments, tubes 16 might be arranged in other suitable configurations. For example, tubes 16 might be arranged in a pyramid or honeycomb-type configuration. The pyramid or honeycomb-type configuration may be referred to as respective tubes 16 in the next row being offset with each other in between two tubes 16 from the initial row. These alternative arrangements apply to the tubes 16 as individual components and to the tubes 16 formed out of a solid mass.

Each tube 16 can include any suitable number of battery cells 14. For example, FIG. 2 shows each tube 16 holding four cylindrical cells. In one or more embodiments, each tube 16 can include from 2 to 7 cells 14, in other embodiments, from 2 to 10 cells 14, and in other embodiments, from 2 to 20 cells 14. In one or more embodiments, each tube 16 can include 4 cells 14, in other embodiments, 7 cells 14, in other embodiments, 8 cells 14, in other embodiments 10 cells 14, and in other embodiments, 20 cells 14.

Each module 12 can include any suitable number of sticks or tubes 16. In one or more embodiments, each module 12 can include from 8 to 14 sticks or tubes 16, in other embodiments, from 4 to 12 sticks or tubes 16, in other embodiments, from 6 to 18 sticks or tubes 16, and in other embodiments, from 2 to 24 sticks or tubes 16. In one or more embodiments, each module 12 can include 8 sticks or tubes 16, in other embodiments, 4 sticks or tubes 16, in other embodiments, 7 sticks or tubes 16, and in other embodiments, 16 sticks or tubes 16.

Battery pack assembly 10 can include any suitable number of modules 12. In one or more embodiments, each module 12 can include from 20 to 40 modules 12, in other embodiments, from 10 to 60 modules 12, and in other embodiments, from 5 to 100 modules 12. In one or more embodiments, battery pack assembly 10 can include 24 modules 12, in other embodiments, 36 modules 12, in other embodiments, 50 modules 12, and in other embodiments, 100 modules 12.

As generally known to the skilled person, a battery management system (BMS) is an electronic system that manages a rechargeable battery. Suitable details for designing a BMS that can be utilized with battery pack assembly 10 will be generally known to the skilled person. As disclosed elsewhere herein, embodiments of the present invention provide advantages for a BMS.

In one or more embodiments, it may be advantageous to utilize battery pack assembly 10 with modules 12 being charged to a maximum of less than 100% (e.g. 80%, 90%, or 80% to 90%). In certain instances, it may be that charging modules 12 to their limit (i.e. 100%) and discharging modules 12 to their limit (i.e. 0%) can cause quicker imbalance of battery pack assembly 10.

In one or more embodiments, battery pack assembly 10 can be utilized with a cut-off switch (not shown). In this way, if a vehicle 50 is sitting and draws down a certain amount of energy, any parasitic loads would just be turned off or cut off. This would generally serve to prevent undesired draining of battery pack assembly 10. In one or more embodiments, battery pack assembly 10 can include an appropriate electronic configuration such that each series (i.e. module 12) could take itself out of the loop, for example when the car is at rest.

Many advantages are discussed above, and yet other advantages are discussed here.

If even one battery cell 14 goes bad, the one bad cell 14 can be replaced. In many conventional battery packs, the cell would have to stay in place and could not be replaced. For battery pack assembly 10, some cells 14 can be discarded, while some cells 14 can be re-used and/or repurposed. Being able to segregate battery cells 14 by the life left in them can be easily accomplished since each cell 14 can be simply and individually tested.

As discussed above, embodiments of battery pack assembly 10 generally do not require permanent, non-removable (i.e. without damage or breakage) fixation of components, for example, as by welding or soldering. In one or more embodiments, battery pack assembly 10 may be devoid of or substantially devoid of a material or substance that will permanently or substantially permanently fixedly secure cells 14 with each other and/or end cap assemblies 18 with tubes 16. In one or more embodiments, battery pack assembly 10 may be devoid of or substantially devoid of welding. In one or more embodiments, battery pack assembly 10 may be devoid of or substantially devoid of soldering. As used here, the term substantially devoid may refer to lacking that amount of material that would otherwise cause a permanent securement (i.e. without damage or breakage).

In one or more embodiments, battery pack assembly 10 may consist essentially of battery pack modules 12, and the corresponding electrical components necessary for operation (e.g. wires). This may refer to battery pack assembly 10 not including any components that would preclude the advantages discussed herein. In one or more embodiments, battery pack assembly 10 may consist of battery pack modules 12, and the corresponding electrical components necessary for operation (e.g. wires).

In one or more embodiments, battery pack module 12 may consist essentially of the plurality of individual battery cells 14, the plurality of tubes 16, and the end cap assemblies 18, and the corresponding electrical components necessary for operation (e.g. wires). This may refer to battery pack module 12 not including any components that would preclude the advantages discussed herein. In one or more embodiments, battery pack module 12 may consist of the plurality of individual battery cells 14, the plurality of tubes 16, and the end cap assemblies 18, and the corresponding electrical components necessary for operation (e.g. wires).

As suggested above, as few as one cell 14 can be repaired. Based on the use of cells 14 within modules 12, if there is one bad cell 14 in a module 12, that cell 14 can be taken out and then all the remaining cells 14 in the module 12 can be first paralleled with a new cell 14 before installing the cells 14 in series again. That module 12 with the new cell 14 can then be placed back into the battery pack assembly 10 and all the modules 12 will equalize.

In light of the foregoing, it should be appreciated that the present invention advances the art by providing an improved battery pack assembly. While particular embodiments of the invention have been disclosed in detail herein, it should be appreciated that the invention is not limited thereto or thereby inasmuch as variations on the invention herein will be readily appreciated by those of ordinary skill in the art. The scope of the invention shall be appreciated from the claims that follow.

What is claimed is:

1. A battery pack assembly for an electric vehicle, the battery pack assembly comprising
   a plurality of battery modules, respective ones of the plurality of battery modules including
      a plurality of tubes as hollow elongated cylindrical structures, respective ones of the plurality of tubes including a plurality of individual battery cells therein, wherein the plurality of individual battery cells within the respective ones of the plurality of tubes are in series configuration, where an inner diameter of the plurality of tubes is similar to an outer diameter of the plurality of individual battery cells as to securely position the plurality of individual battery cells relative to each other within any given one of the plurality of tubes, wherein the plurality of tubes are distinct individual components; and
      a pair of end cap assemblies positioned at respective ends of the plurality of tubes, the pair of end cap assemblies securing the plurality of individual battery cells and the plurality of tubes in a tightened position by mechanical pressure;
      the pair of end cap assemblies including a respective electrical connector for connecting the plurality of individual battery cells to the electric vehicle when the battery pack assembly is in the tightened position;
      wherein the plurality of tubes are in series configuration within the respective ones of the plurality of battery modules, and wherein the plurality of battery modules are in parallel configuration relative to the other of the plurality of battery modules, such that respective ones of the plurality of battery modules are balanced as a same voltage and this same voltage is also the same as a voltage of the battery pack assembly.

2. The battery pack assembly of claim 1, wherein the tightened position is achieved by mechanical pressure applied via threaded rods and nuts, where the threaded rods extend a length between the pair of end cap assemblies.

3. The battery pack assembly of claim 1, wherein the battery pack assembly is devoid of welding, soldering, and gluing in order to hold the plurality of individual battery cells together and to electrically connect the plurality of individual battery cells.

4. The battery pack assembly of claim 1, wherein the pair of end cap assemblies each include depressions corresponding to the shape of an outer diameter of the plurality of tubes.

5. The battery pack assembly of claim 1, wherein the pair of end cap assembles are flat with no depressions corresponding to the shape of an outer diameter of the plurality of tubes.

6. The battery pack assembly of claim 1, wherein the pair of end cap assemblies have raised areas to provide better contact between the plurality of individual battery cells and the respective electrical connector.

7. The battery pack assembly of claim 1, wherein the battery pack assembly is secured to a support frame within the electric vehicle.

8. The battery pack assembly of claim 1, wherein the electric vehicle is a 4-wheel car or a 3-wheel vehicle.

9. The battery pack assembly of claim 1, wherein at least one of the pair of end cap assemblies includes a compressible material to account for differences in height between respective ones of the pluralities of individual battery cells, where the compressible material is neoprene.

10. The battery pack assembly of claim 1, wherein the pair of end cap assemblies each include further electrical connectors to electrically connect the plurality of tubes within a respective one of the plurality of battery modules.

11. The battery pack assembly of claim 1, wherein the electrical connectors connect a positive end and a negative end of one of the plurality of battery modules to the other ones of the plurality of battery modules to form the battery pack assembly.

12. The battery pack assembly of claim 1, where the plurality of tubes and the plurality of individual battery cells are part of respective tube assemblies consisting of the plurality of tubes and the plurality of individual battery cells.

13. The battery pack assembly of claim 1, where the battery pack assembly consists essentially of the plurality of battery modules and corresponding electrical components necessary for operation.

14. The battery pack assembly of claim 1, where the battery pack assembly consists of the plurality of battery modules and corresponding electrical components necessary for operation.

15. The battery pack assembly of claim 1, where the plurality of battery modules consist of the plurality of tubes, the pair of end cap assemblies, and threaded rods with nuts to achieve the tightened position by mechanical pressure, where the threaded rods extend a length between the pair of end cap assemblies.

16. The battery pack assembly of claim 1, where the plurality of individual battery cells are solid cylindrical battery cells.

17. The battery pack assembly of claim 1, where the plurality of individual battery cells includes an inner plurality of individual battery cells with respective positive ends in direct contact with respective negative ends.

* * * * *